US011299206B2

(12) United States Patent
Matsumoto et al.

(10) Patent No.: US 11,299,206 B2
(45) Date of Patent: Apr. 12, 2022

(54) VEHICLE STRUCTURE FOR A CROSS-VEHICLE LOAD PATH

(71) Applicant: GM GLOBAL TECHNOLOGY OPERATIONS LLC, Detroit, MI (US)

(72) Inventors: Andre T. Matsumoto, Sterling Heights, MI (US); Zohir Molhem, Rochester Hills, MI (US); Terry A. Swartzell, Ann Arbor, MI (US); Michael T. Quaggiotto, Windsor (CA); Mark. T. Dingman, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 81 days.

(21) Appl. No.: 16/568,559

(22) Filed: Sep. 12, 2019

(65) Prior Publication Data

US 2021/0078636 A1    Mar. 18, 2021

(51) Int. Cl.
*B62D 21/15* (2006.01)
*B62D 21/11* (2006.01)
*B62D 21/03* (2006.01)

(52) U.S. Cl.
CPC .......... *B62D 21/155* (2013.01); *B62D 21/03* (2013.01); *B62D 21/11* (2013.01)

(58) Field of Classification Search
CPC ...... B62D 21/03; B62D 21/11; B62D 21/155; B62D 21/09; B62D 21/152; B62D 25/08; B62D 25/085
See application file for complete search history.

(56) References Cited

U.S. PATENT DOCUMENTS

| | | | | |
|---|---|---|---|---|
| 5,308,115 A * | 5/1994 | Ruehl | ............... | B62D 21/02 280/785 |
| 5,409,264 A * | 4/1995 | Nakatani | ......... | B60K 15/03504 280/784 |
| 5,472,259 A * | 12/1995 | Akiyama | ............... | B62D 21/11 280/795 |
| 5,601,304 A * | 2/1997 | Tilly | ............... | B60G 3/06 280/124.15 |
| 5,634,663 A * | 6/1997 | Krupp | ............... | B62D 21/02 280/781 |
| 6,408,974 B1 * | 6/2002 | Viduya | ............... | B62D 21/00 180/312 |
| 6,533,059 B2 * | 3/2003 | Lecuit | ............... | B60K 13/04 180/311 |
| 6,619,730 B2 * | 9/2003 | Porner | ............... | B62D 21/11 180/311 |
| 6,869,090 B2 * | 3/2005 | Tatsumi | ............... | B60G 3/20 280/124.109 |

(Continued)

*Primary Examiner* — Laura Freedman
(74) *Attorney, Agent, or Firm* — Quinn IP Law

(57) ABSTRACT

A load impact management system for an automotive vehicle includes a load member extending from a first vehicle frame rail to a second vehicle frame rail and perpendicular to each of the first and second vehicle frame rails and to a vehicle body axis. The load member is coupled to the first vehicle frame rail at two attachment points and coupled to the second vehicle frame rail at two attachment points. The load member defines a load path between a first side of the automotive vehicle to a second side of the automotive vehicle opposite the first side and the load member is forward of a passenger compartment of the vehicle.

14 Claims, 3 Drawing Sheets

(56) References Cited

U.S. PATENT DOCUMENTS

| | | | | |
|---|---|---|---|---|
| 7,380,829 | B2* | 6/2008 | Kishima | B62D 21/155 180/232 |
| 7,475,754 | B2* | 1/2009 | Misaki | B62D 21/11 180/291 |
| 7,540,556 | B2* | 6/2009 | Yamada | B62D 21/152 296/187.09 |
| 7,568,755 | B2* | 8/2009 | Imada | B62D 21/152 296/187.11 |
| 7,614,658 | B2* | 11/2009 | Yamada | B62D 21/152 280/784 |
| 7,770,927 | B2* | 8/2010 | Dandekar | B60R 19/12 280/784 |
| 8,262,155 | B2* | 9/2012 | Leanza | B62D 29/004 296/205 |
| 8,875,834 | B1* | 11/2014 | Sirbu | B62D 21/03 180/312 |
| 9,067,627 | B2* | 6/2015 | Hara | B62D 21/152 |
| 9,937,781 | B1* | 4/2018 | Bryer | B62D 35/02 |
| 10,471,993 | B2* | 11/2019 | Kramer | B62D 21/15 |

* cited by examiner

VEHICLE STRUCTURE FOR A CROSS-VEHICLE LOAD PATH

INTRODUCTION

The present disclosure relates generally to a vehicle structure for a cross-vehicle load path and means for lateral deflection of loads applied to the vehicle due to small overlap impacts.

Vehicle manufacturers use a variety of structures and components to transfer energy throughout the vehicle structure to protect the vehicle components and a vehicle's occupants during a collision. Light-duty vehicles, such as a majority of passenger cars, often employ a monocoque or unibody construction that eschews a separate body and frame, in favor of a lighter, integrated structure. Additionally, some lighter-duty vehicles employ a combination or semi-monocoque structure with a subframe for carrying the vehicle's powertrain and other components. Frequently, additional structural members are used to buttress the vehicle body structure, as well as for supporting various chassis and powertrain subsystems.

An integral frame and body construction requires more than simply attaching an unstressed body to a conventional frame. In a fully integrated body structure, the entire vehicle is a load-carrying unit that handles all the loads experienced by the vehicle, such as forces from driving and cargo. Integral-type bodies for wheeled vehicles are typically manufactured by welding preformed metal panels and other components together, by forming or casting whole sections as one piece, or by a combination of these techniques. An integral frame and body construction is generally lighter and more rigid than a vehicle having a separate body and frame.

In unibody vehicle construction, the frame, the exterior shell, and the chassis are made as a single structure, with box sections, bulkheads, and tubes providing additional rigidity, while the skin adds relatively little strength or stiffness. A true monocoque frame is basically a "skin" that supports various loads by distributing tension and compression across its surface and lacks a load-carrying internal frame. Although such a structure is sometimes also referred to as monocoque, because the vehicle's outer skin and panels are made loadbearing, there are still ribs, bulkheads and box sections to reinforce the body, making the description semi-monocoque more appropriate.

SUMMARY

Embodiments according to the present disclosure provide a number of advantages. For example, embodiments according to the present disclosure enable efficient means of transfer of loads cross-vehicle to achieve lateral deflection and reduce intrusion into the passenger compartment of the vehicle.

In an exemplary embodiment of the present disclosure, a structural arrangement for a vehicle includes a vehicle frame including a first frame rail and a second frame rail spaced apart from and parallel to the first frame rail, the first and second frame rails extending parallel to a vehicle body axis, a cradle including a first side and a second side opposite the first side, at least a portion of the cradle extending transverse to the vehicle body axis, and a load member extending from the first frame rail to the second frame rail and coupled to each of the first and second frame rails. The load member extends perpendicular to each of the first and second frame rails and to the vehicle body axis and is also coupled to the cradle. The load member defines a load path between the first and second frame rails.

In some aspects, the load member includes a first end and a second end opposite the first end. The first end is coupled to the cradle at a first cradle attachment point and to the frame at a first frame attachment point and the second end is coupled to the cradle at a second cradle attachment point and to the frame at a second frame attachment point. The first cradle attachment point is spaced apart from the first frame attachment point and the second cradle attachment point is spaced apart from the second frame attachment point.

In some aspects, the first cradle attachment point is lower than the first frame attachment point and the second cradle attachment point is lower than the second frame attachment point.

In some aspects, the first end of the load member includes a first side wall, a second side wall opposite the first side wall, and a connecting wall connecting the first and second side walls. The first side wall, the second side wall, and the connecting wall form a first channel configured to receive the first side of the cradle.

In some aspects, the second end of the load member includes a second channel configured to receive the second side of the cradle.

In some aspects, the load member further includes a body attachment surface adjacent to the connecting wall and the load member is coupled to the first frame rail at the body attachment surface.

In some aspects, the load member is positioned between the cradle and the vehicle frame.

In some aspects, the load member is a steel member with one of an open and closed cross-section.

In some aspects, the load member is positioned forward of a passenger compartment of the vehicle.

In another exemplary embodiment of the present disclosure, an automotive vehicle includes a vehicle body structure having a vehicle body axis and a vehicle frame arranged along the vehicle body axis. The vehicle body structure defines a passenger compartment and the vehicle frame includes a first frame rail and a second frame rail spaced apart from and parallel to the first frame rail, each of the first and second frame rails extending parallel to the vehicle body axis. The automotive vehicle includes a load transfer system including a load member extending from the first frame rail to the second frame rail and perpendicular to each of the first and second frame rails and to the vehicle body axis. The load member is coupled to the first frame rail at two attachment points and coupled to the second frame rail at two attachment points. The load member defines a load path between a first side of the automotive vehicle to a second side of the automotive vehicle opposite the first side and the load member is forward of the passenger compartment.

In some aspects, the load member is a steel member with one of an open and closed cross-section.

In some aspects, the automotive vehicle further includes a cradle having a first side and a second side opposite the first side and at least a portion of the cradle extends transverse to the vehicle body axis.

In some aspects, the load member includes a first end and a second end opposite the first end. The first end is coupled to the first side of the cradle at a first cradle attachment point and to the first frame rail at a first frame attachment point and the second end is coupled to the second side of the cradle at a second cradle attachment point and to the second frame rail at a second frame attachment point. The first cradle attachment point is spaced apart from the first frame attachment point and the second cradle attachment point is spaced apart from the second frame attachment point.

In some aspects, the first end of the load member includes a first side wall, a second side wall opposite the first side wall, and a connecting wall connecting the first and second side walls and forming a first channel. The first channel is configured to receive the first side of the cradle.

In some aspects, the second end of the load member includes a second channel configured to receive the second side of the cradle.

In some aspects, the load member includes a first end and a second end opposite the first end, the first end coupled to the first frame rail at a first connection surface and at a second connection surface perpendicular to the first connection surface, and the second end coupled to the second frame rail at a third connection surface and at a fourth connection surface perpendicular to the third connection surface.

In another exemplary embodiment of the present disclosure, a load impact management system for an automotive vehicle having a vehicle frame including a first frame rail and a second frame rail parallel to the first frame rail, the vehicle frame defining a vehicle body axis, includes a load member extending from the first frame rail to the second frame rail and perpendicular to each of the first and second frame rails and to the vehicle body axis. The load member is coupled to the first frame rail at two attachment points and coupled to the second frame rail at two attachment points. The load member defines a load path between a first side of the automotive vehicle to a second side of the automotive vehicle opposite the first side and the load member is forward of a passenger compartment of the vehicle.

In some aspects, the load member is a steel member with one of an open and closed cross-section.

In some aspects, the load member includes a first end and a second end opposite the first end. The first end is coupled to the first frame rail at a first connection surface and at a second connection surface perpendicular to the first connection surface and the second end is coupled to the second frame rail at a third connection surface and at a fourth connection surface perpendicular to the third connection surface.

In some aspects, the first connection surface is adjacent to and coplanar with an inner surface of the first frame rail and the second connection surface shares an edge with the first connection surface and is coplanar with a top surface of the first frame rail.

BRIEF DESCRIPTION OF THE DRAWINGS

The present disclosure will be described in conjunction with the following figures, wherein like numerals denote like elements.

Figure 2A:
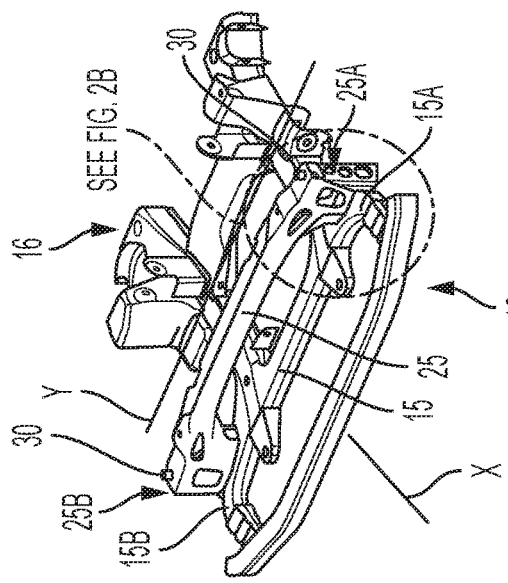
FIG. 2A is an enlarged partial perspective view of the cross-vehicle vehicle load member of FIG. 1, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Deflection strategies for vehicles exposed to a small front overlap impact often rely on the powertrain as a lateral load path to minimize intrusion into the passenger compartment of the vehicle. However, electric vehicles include either no motor in the front compartment or a narrow or small electric motor that does not provide a desired deflection of the load applied during the small front overlap impact. The addition of a cross-vehicle load member supplements or replaces the powertrain load path, providing lateral deflection of the force applied during the impact event and reduction of the energy managed by the vehicle structure and improve mounting isolation. The cross-vehicle load path established by the cross-vehicle load member enables early and robust lateral deflection for vehicles, including electric vehicles, by transferring the loads applied in the Y-direction to the opposite side of the vehicle from the impact event, increasing the vehicle's lateral velocity and minimizing intrusion into the passenger compartment while reducing the span of the mount beam length to improve the mount structure performance.

In various embodiments the cross-vehicle load member also improves the focused isolation by bringing the elastic plane closer to the electric motor center of gravity, which is particularly useful for tall and narrow electric motor designs.

Shifting the motor mounts to the cross-vehicle load member also enables an "all mounts to cradle" solution that reduces the tooling fixtures needed during vehicle assembly. This improves manufacturing tooling efficiency and reduces tooling and labor cost. This structure also improves tolerance for the motor mount system, further improving the mount preload to improve isolation.

Figure 1:
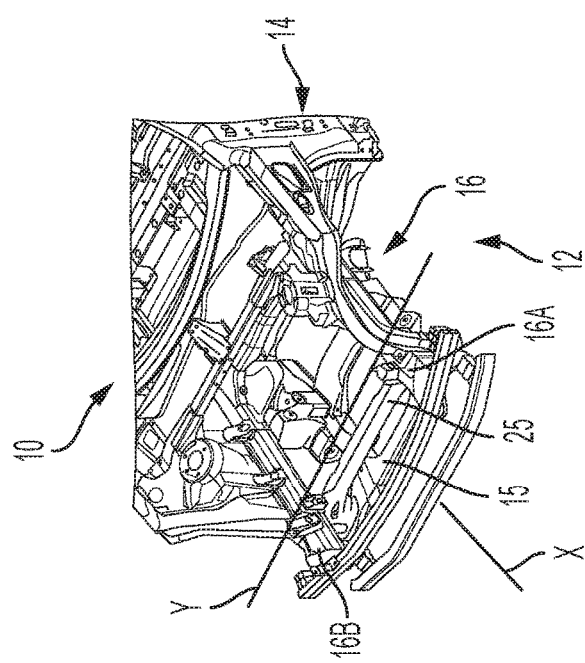
FIG. 1 is a schematic front perspective partial view of an integrated vehicle body structure having a cross-vehicle vehicle load member, according to an embodiment.

Referring to the drawings, wherein like reference numbers refer to like components, FIG. 1 is a perspective schematic partial view of a vehicle 10 having a vehicle body structure 12 enclosing a passenger compartment. The vehicle body structure 12 is made up of a vehicle body 14 constructed from a number of components, such as exterior body panels (not shown), sub-structures, and a frame 16. The vehicle body 14 is characterized by a longitudinal vehicle centerline or vehicle body axis that generally coincides with an X-axis and is orthogonal to a Y-axis.

The vehicle body 14 is attached to a frame 16, thus enabling a support structure for a vehicle suspension and wheels (not shown), while also supporting vehicle subsystems, such as a steering system, a powertrain, passengers, and cargo (not shown). As shown in FIG. 1, the frame 16 is arranged in the general plane of the vehicle 10, substantially defined by the X and Y axes. As appreciated by those skilled in the art, the disclosed vehicle body structure 12 may be used in a rear-wheel drive, a front-wheel drive, or a four-wheel drive configuration.

With continued reference to FIG. 1, the frame 16 includes two frame rails, 16A and 16B. The frame rails 16A and 16B may be spaced apart and substantially parallel with respect to each other, e.g., within +/−5° of true parallel, and arranged substantially along the vehicle body axis. In various embodiments, the frame rails 16A, 16B may be configured as partial rails, thereby defining an integral body and frame structure. Such an integral vehicle body structure 12 lacks a separate load-carrying internal frame, and may have either a "unibody" or a "semi-monocoque" construction, as identified in the art. In the unibody construction, the frame, the floor plan, and the chassis are typically combined into a single structure which uses box sections, bulkheads, and tubes to provide most of the strength of the vehicle body, while exterior body panels add relatively little strength or stiffness. Similar to the unibody structure, a semi-monocoque construction is an integrated structure that employs ribs, bulkheads, and box sections to reinforce the vehicle body, while the outer body panels bear a smaller portion of the structural load.

The first and second frame rails 16A, 16B are arranged substantially symmetrically with respect to the longitudinal vehicle centerline or the X-axis. As used herein, the term "substantially symmetrically" may denote a positioning of specified components that is within +/−5 cm of true symmetry with respect to the longitudinal vehicle centerline. The first and second frame rails 16A, 16B may be constructed from aluminum and be formed by one or more appropriate methods, such as extrusion, hydroforming, roll-forming, stamping, and joined by welding, bonding, or mechanical fasteners.

Figure 2B:
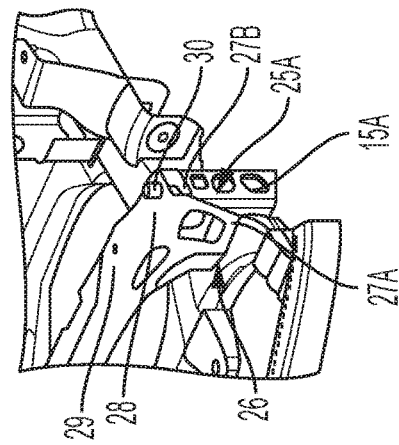
FIG. 2B is another enlarged partial perspective view of one end of the cross-vehicle vehicle load member of FIG. 1, according to an embodiment.

With continued reference to FIGS. 1, 2A, and 2B, the vehicle body structure 12 includes a cradle 15. At least a portion of the cradle 15 extends transverse to the longitudinal vehicle centerline illustrated by the X-axis and supports a propulsion component of the vehicle 10, such as an electric motor or engine, for example and without limitation. The cradle 15 includes a first end or side 15A and a second end or side 15B opposite the first end or side 15A.

As may be seen in FIGS. 1 and 2A, a cross-vehicle load member 25 extends from a first side of the vehicle 10 to a second side of the vehicle 10 opposite the first side. The cross-vehicle load member 25 is arranged substantially parallel to the lateral vehicle axis or the Y-axis and substantially transverse or perpendicular to the longitudinal vehicle centerline illustrated by the X-axis. In various embodiments, the cross-vehicle load member 25 may have a steel or aluminum construction with either a generally circular or rectangular open or closed cross-section. In various embodiments, the cross-vehicle load member 25 is directly coupled to and supports a propulsion component of the vehicle 10, such as an electric motor or engine, for example and without limitation.

In various embodiments, the cross-vehicle load member 25 includes a first end 25A and a second end 25B opposite the first end 25A. In the embodiment shown in FIGS. 1 and 2A, the first end 25A is coupled to the first end or side 15A of the cradle 15 at a first cradle attachment point. The second end 25B of the cross-vehicle load member 25 is coupled to the second end or side 15B of the cradle 15 at a second cradle attachment point. In various embodiments, the cross-vehicle load member 25 is coupled to the cradle 15 by welding, bonding, or one or more mechanical fasteners 30. In various embodiments, the fastener 30 is a mechanical fastener such as a bolt, rivet, etc. The specific number and location of the fasteners may be selected based on the desired stiffness of the connection between the cross-vehicle load member 25 and the engine cradle 15.

In various embodiments, as shown in FIG. 1, the cross-vehicle load member 25 is also coupled to the frame 16. The first end 25A of the cross-vehicle load member 25 is coupled to the cradle 15 at the first cradle attachment point and the frame rail 16A at a first frame attachment point. Similarly, the second end 25B of the cross-vehicle load member 25 is coupled to the cradle 15 at the second cradle attachment point and the frame rail 16B at a second frame attachment point. In various embodiments, the first cradle attachment point is spaced apart from the first frame attachment point and the second cradle attachment point is spaced apart from the second frame attachment point. In various embodiments, the cross-vehicle load member 25 is joined to the frame 16 by welding, bonding, or one or more mechanical fasteners, such as the fastener 30. The specific number and location of the fasteners may be selected based on the desired stiffness of the connection between the cross-vehicle load member 25 and the frame 16.

FIG. 2B illustrates an enlarged view of the first end 25A of the cross-vehicle load member 25. In various embodiments, the first end 25A of the cross-vehicle load member 25 includes a channel 26 formed by a first side wall 27A, a second side wall 27B opposite the first side wall, and a connecting wall 28 connecting the first and second side walls 27A, 27B. The channel 26 is configured to receive the first end or side 15A of the cradle 15. As discussed herein, in various embodiments, one or more fasteners 30 mechanically couple the first end 25A of the cross-vehicle load member 25 to the first end 15A of the cradle 15. In various embodiments, the fastener 30 extends through the connecting wall 28. While FIG. 2B illustrates the first end 25A of the cross-vehicle load member 25, it is understood that the second end 25B of the cross-vehicle load member 25 also includes similar features as those described with respect to the first end 25A.

With continuing reference to FIG. 2B, the cross-vehicle load member 25 also includes a body attachment surface 29. The body attachment surface 29 is adjacent to the connecting wall 28. In various embodiments, the body attachment surface 29 is the connecting surface between the cross-vehicle load member 25 and the frame 16, as shown in FIG. 1. In various embodiments, an opening extends through the body attachment surface 29 to allow a fastener, such as the fastener 30, to couple the frame 16 to the body attachment surface 29. In various embodiments, the body attachment surface 29 is not coplanar with the connecting wall 28 surface.

Figure 4:
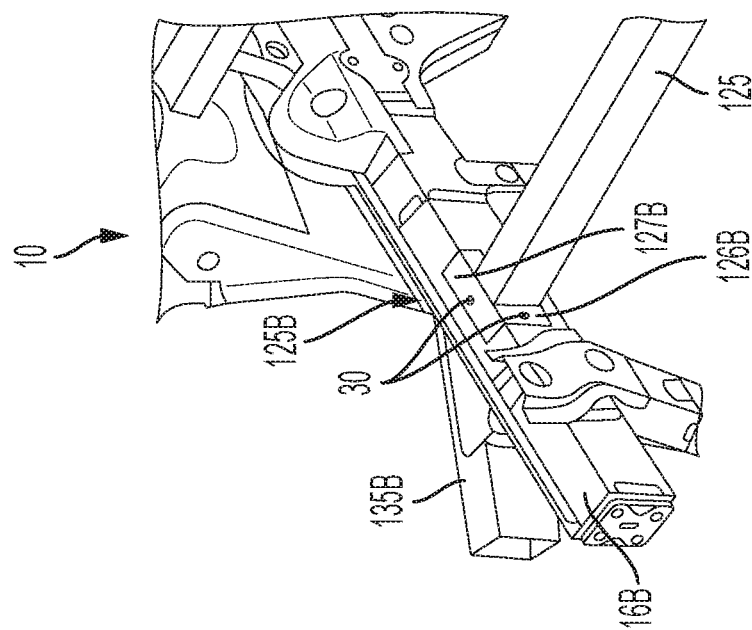
FIG. 4 is an enlarged partial perspective view of the cross-vehicle vehicle load member of FIG. 3, according to an embodiment.
Figure 3:
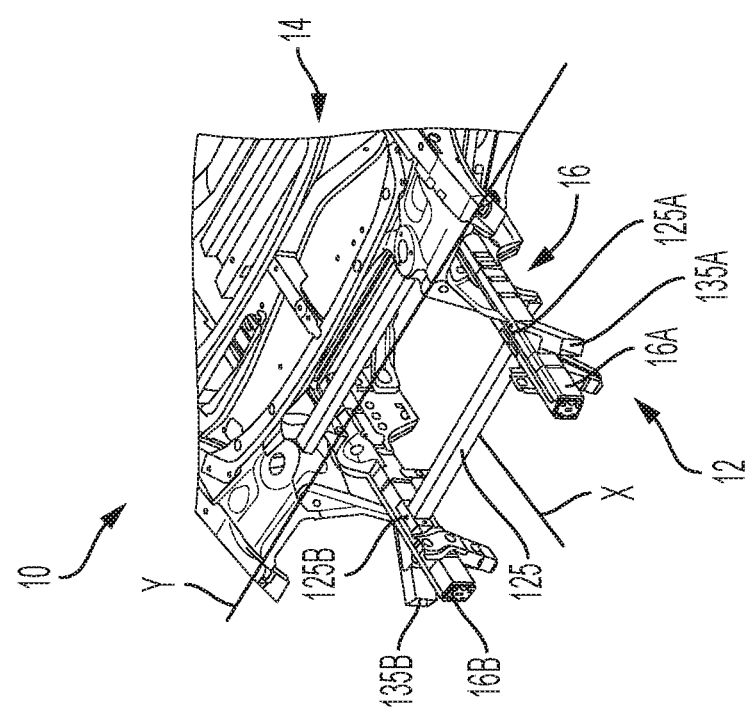
FIG. 3 is a schematic front perspective partial view of an integrated vehicle body structure having a cross-vehicle vehicle load member, according to another embodiment.

With reference now to FIGS. 3 and 4, a second embodiment of a cross-vehicle load member 125 is illustrated as a component of the vehicle 10. Similar to the cross-vehicle load member 25, the cross-vehicle load member 125 may have a steel or aluminum construction with either a generally circular or rectangular open or closed cross-section. In the embodiment shown in FIGS. 3 and 4, the cross-vehicle load member 125 is coupled directly to the frame 16. In various embodiments, the cross-vehicle load member 125 is directly coupled to and supports a propulsion component of the vehicle 10, such as an electric motor or engine, for example and without limitation.

Similar to the embodiment shown in FIGS. 1 and 2, the vehicle 10 includes a vehicle body structure 12. The vehicle body structure 12 is made up of a vehicle body 14 constructed from a number of components, such as exterior body panels (not shown), sub-structures, and a frame 16. The vehicle body 14 is characterized by a longitudinal vehicle centerline or vehicle body axis that generally coincides with an X-axis and is orthogonal to a Y-axis.

The first and second frame rails 16A, 16B are arranged substantially symmetrically with respect to the longitudinal vehicle centerline or the X-axis. The cross-vehicle load member 125 extends from a first side of the vehicle 10 to a second side of the vehicle 10 opposite the first side. The cross-vehicle load member 125 is arranged substantially parallel to the lateral vehicle axis or the Y-axis and substantially transverse to the longitudinal vehicle centerline illustrated by the X-axis.

In various embodiments, the cross-vehicle load member 125 includes a first end 125A and a second end 125B opposite the first end 125A. In the embodiment shown in FIGS. 3 and 4, the first end 125A is coupled to the frame rail 16A at a first attachment point. The second end 125B of the cross-vehicle load member 125 is coupled to the frame rail 16B at a second attachment point. In various embodiments, the cross-vehicle load member 125 is joined to the frame rails 16A, 16B by welding, bonding, or one or more mechanical fasteners 30. In various embodiments, the fastener 30 is a mechanical fastener such as a bolt, rivet, etc. The specific number and location of the fasteners may be selected based on the desired stiffness of the connection between the cross-vehicle load member 25 and the frame 16.

With reference to FIG. 4, in various embodiments, the second end 125B of the cross-vehicle load member 125 includes a first connection surface 126B and a second connection surface 127B. The first connection surface 126B extends perpendicular to the end of the cross-vehicle load member 125 such that the first connection surface 126 is adjacent to and coplanar with an inner surface of the frame rail 16B. The second connection surface 127B extends perpendicular to the first connection surface 126B and shares at least part of an edge with the first connection surface 126B. The second connection surface 127B is adjacent to and coplanar with a top surface of the frame rail 16B. The first and second connection surfaces 126B, 127B wrap around an edge of the frame rail 16B to provide two connection surfaces with the frame rail 16B. Each of the first and second connection surfaces 126B, 127B, in some embodiments, include openings configured to receive mechanical fasteners, such as the fastener 30, to couple the cross-vehicle load member 125 to the frame rail 16B. While FIG. 4 illustrates the second end 125B of the cross-vehicle load member 125, it is understood that the first end 125A of the cross-vehicle load member 125 also includes similar features and connection surfaces as those described with respect to the second end 125B.

In various embodiments, the vehicle 10 may include one or more deflector members 135A, 135B. The deflector members 135A, 135B extend outward of the frame 16. In various embodiments, the deflector member 135A is coupled to the frame rail 16A and the deflector member 135B is coupled to the frame rail 16B. Each of the deflector members 135A, 135B extend forward and outward of the frame rails 16A, 16B such that the deflector member 135A forms a first angle with the frame rail 16A and the deflector member 135B forms a second angle with the frame rail 16B. In various embodiments, the first and second angles are substantially equal. In some embodiments, the deflector members 135A, 135B are coupled to a bumper beam of the vehicle 10. In various embodiments, the deflector members 135A, 135B are coupled to the frame 16 by welding, bonding, or one or more mechanical fasteners. In various embodiments, the deflector members 135A, 135B are unitarily formed with the frame rails 16A, 16B. In various embodiments, the deflector members 135A, 135B are coupled to the bumper beam of the vehicle by welding, bonding, or one or more mechanical fasteners.

Figure 6:
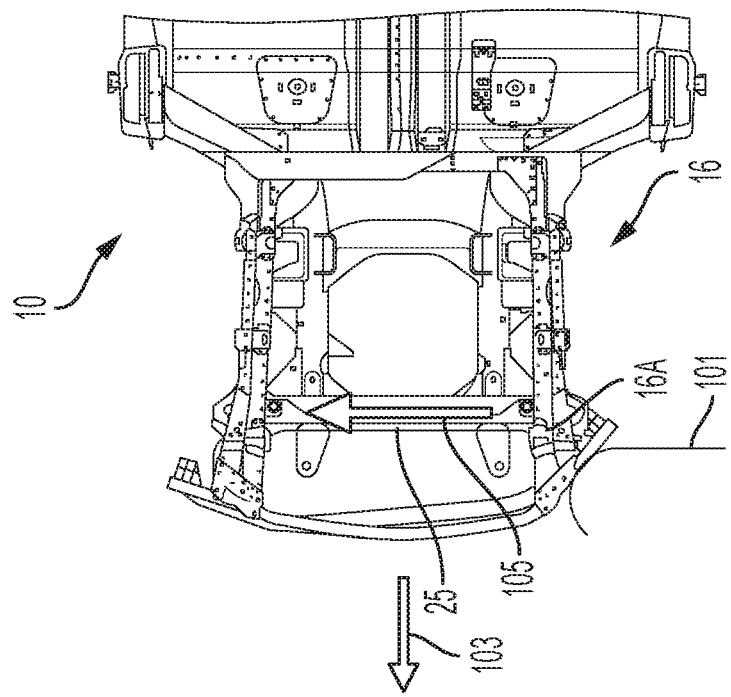
FIG. 6 is a schematic partial top view of the integrated vehicle body structure of FIG. 1 after application of a front small overlap impact, according to an embodiment.
Figure 5:
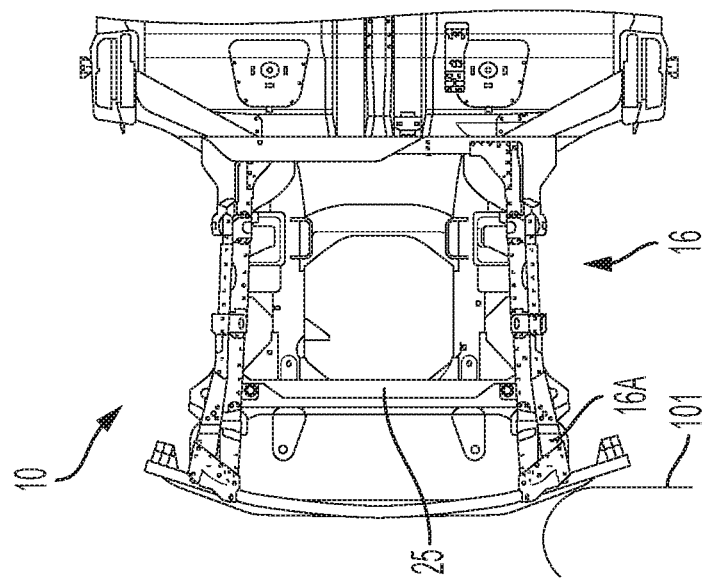
FIG. 5 is a schematic partial top view of the integrated vehicle body structure of FIG. 1 prior to application of a front small overlap impact, according to an embodiment.

FIGS. 5 and 6 illustrate the response of the vehicle 10 to a small overlap impact event. As the vehicle 10 travels in the direction indicated by the arrow 103, that is, from right to left as shown in the figures, the vehicle 10 impacts a barrier 101. The barrier 101 imparts a load to the vehicle 10 at the left front corner, proximate to the frame rail 16A. The load imparted by the impact is transferred from the first side of the vehicle 10 to the second side of the vehicle 10 opposite to the first side, through the cross-vehicle load member 25. The load path, indicated by the arrow 105, established by the cross-vehicle load member 25 enables the vehicle 10 to have greater lateral deflection from the barrier and minimizes intrusion of vehicle components into the passenger compartment.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A structural arrangement for a vehicle, comprising:
    a vehicle frame including a first frame rail and a second frame rail spaced apart from and parallel to the first frame rail, each of the first and second frame rails extending parallel to a vehicle body axis;
    a load member aligned in a transverse plane of the vehicle, the load member extending from the first frame rail to the second frame rail and coupled to each of the first and second frame rails at two attachment points, the load member extending perpendicular to each of the first and second frame rails and to the vehicle body axis;
    wherein the load member includes a first end and a second end opposite the first end, the first end coupled to the first frame rail at a first connection surface and at a second connection surface perpendicular to the first connection surface, and the second end coupled to the second frame rail at a third connection surface and at a fourth connection surface perpendicular to the third connection surface;
    wherein the load member defines a load path between the first and second frame rails, and the load member is positioned forward of a passenger compartment of the vehicle; and
    wherein the first connection surface is adjacent to and coplanar with an inner surface of the first frame rail and the second connection surface shares an edge with the first connection surface and is coplanar with a top surface of the first frame rail.

2. The structural arrangement for the vehicle of claim 1, wherein the load member is a steel member with one of an open and closed cross-section.

3. The structural arrangement for the vehicle of claim 1, wherein the first and second connection surfaces wrap around an edge of the first frame rail to provide two connection surfaces with the first frame rail.

4. The structural arrangement for the vehicle of claim 1, wherein each of the first and second connection surfaces includes at least one opening configured to receive a mechanical fastener.

5. The structural arrangement for the vehicle of claim 1, wherein the first frame rail includes a first deflector member that extends forward and outward of the first frame rail and the second frame rail includes a second deflector member that extends forward and outward of the second frame rail.

6. The structural arrangement for the vehicle of claim 5, wherein the first deflector member is formed unitarily with the first frame rail and the second deflector member is formed unitarily with the second frame rail.

7. An automotive vehicle, comprising:
    a vehicle body structure having a vehicle body axis and a vehicle frame arranged along the vehicle body axis, the vehicle body structure defining a passenger compartment and the vehicle frame including a first frame rail and a second frame rail spaced apart from and parallel to the first frame rail, each of the first and second frame rails extending parallel to the vehicle body axis;
    a load transfer system comprising a load member extending from the first frame rail to the second frame rail and perpendicular to each of the first and second frame rails and to the vehicle body axis, the load member coupled to the first frame rail at two attachment points and coupled to the second frame rail at two attachment points;

wherein the load member includes a first end and a second end opposite the first end, the first end coupled to the first frame rail at a first connection surface and at a second connection surface perpendicular to the first connection surface, and the second end coupled to the second frame rail at a third connection surface and at a fourth connection surface perpendicular to the third connection surface;

wherein the load member defines a load path between a first side of the automotive vehicle to a second side of the automotive vehicle opposite the first side and the load member is forward of the passenger compartment; and wherein the first connection surface is adjacent to and coplanar with an inner surface of the first frame rail and the second connection surface shares an edge with the first connection surface and is coplanar with a top surface of the first frame rail.

8. The automotive vehicle of claim 7, wherein the load member is a steel member with one of an open and closed cross-section.

9. The automotive vehicle of claim 7, wherein the first and second connection surfaces wrap around an edge of the first frame rail to provide two connection surfaces with the first frame rail.

10. The automotive vehicle of claim 7, wherein each of the first and second connection surfaces include at least one opening configured to receive a mechanical fastener.

11. The automotive vehicle of claim 7, wherein the first frame rail includes a first deflector member that extends forward and outward of the first frame rail and the second frame rail includes a second deflector member that extends forward and outward of the second frame rail.

12. The automotive vehicle of claim 11, wherein the first deflector member is formed unitarily with the first frame rail and the second deflector member is formed unitarily with the second frame rail.

13. A load impact management system for an automotive vehicle having a vehicle frame including a first frame rail and a second frame rail parallel to the first frame rail, the vehicle frame defining a vehicle body axis, the system comprising:

a load member aligned in a transverse plane of the automotive vehicle, the load member extending from the first frame rail to the second frame rail and perpendicular to each of the first and second frame rails and to the vehicle body axis, the load member coupled to the first frame rail at two attachment points and coupled to the second frame rail at two attachment points;

wherein the load member includes a first end and a second end opposite the first end, the first end coupled to the first frame rail at a first connection surface and at a second connection surface perpendicular to the first connection surface, and the second end coupled to the second frame rail at a third connection surface and at a fourth connection surface perpendicular to the third connection surface;

wherein the load member defines a load path between a first side of the automotive vehicle and a second side of the automotive vehicle opposite the first side and the load member is forward of a passenger compartment of the vehicle; and wherein the first connection surface is adjacent to and coplanar with an inner surface of the first frame rail and the second connection surface shares an edge with the first connection surface and is coplanar with a top surface of the first frame rail.

14. The load impact management system of claim 13, wherein the load member is a steel member with one of an open and closed cross-section.

* * * * *